United States Patent
Yang et al.

(10) Patent No.: US 12,395,967 B2
(45) Date of Patent: Aug. 19, 2025

(54) SYSTEM AND METHOD FOR SIDELINK CONFIGURATION

(71) Applicant: ZTE CORPORATION, Guangdong (CN)

(72) Inventors: Jin Yang, Shenzhen (CN); Weimin Xing, Shenzhen (CN); Youxiong Lu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 412 days.

(21) Appl. No.: 17/876,917

(22) Filed: Jul. 29, 2022

(65) Prior Publication Data

US 2023/0007630 A1  Jan. 5, 2023

Related U.S. Application Data

(63) Continuation of application No. PCT/CN2020/079590, filed on Mar. 17, 2020.

(51) Int. Cl.
*H04W 72/04* (2023.01)

(52) U.S. Cl.
CPC .................. *H04W 72/04* (2013.01)

(58) Field of Classification Search
CPC ..... H04W 72/02; H04W 72/04; H04W 72/11; H04W 72/115; H04W 72/40; H04W 72/52; H04W 72/56; H04W 72/566; H04W 72/542; H04W 92/18; H04W 76/14; H04W 72/25; H04W 72/20; H04W 72/0446

See application file for complete search history.

(56) References Cited

U.S. PATENT DOCUMENTS

| | | | |
|---|---|---|---|
| 2014/0056243 A1* | 2/2014 | Pelletier | H04L 5/0032 370/329 |
| 2014/0071931 A1* | 3/2014 | Lee | H04W 72/21 370/329 |
| 2014/0302865 A1* | 10/2014 | Bai | H04W 24/10 455/452.1 |
| 2015/0382324 A1* | 12/2015 | Sheng | H04W 72/02 370/329 |

(Continued)

FOREIGN PATENT DOCUMENTS

| | | |
|---|---|---|
| CN | 107211430 A | 9/2017 |
| WO | WO-2016/163972 A1 | 10/2016 |

(Continued)

OTHER PUBLICATIONS

Fraunhofer Hhi et al., "Designs for NR V2X Mode 2 Resource Allocation", 3GPP TSG RAN WG1 Meeting #95, R1-1812399, Nov. 16, 2018, Spokane, USA (10 pages).

(Continued)

*Primary Examiner* — Stephen J Clawson
(74) *Attorney, Agent, or Firm* — Foley & Lardner LLP

(57) ABSTRACT

A system and method for sidelink configuration are disclosed herein. In one embodiment, the system and method are configured to obtain, by a first wireless communication device, information required to form a resource set report. The system and method are also configured to transmit by the first wireless communication device, the resource set report indicating a set of resources, wherein the set of resources are selected according to the required information.

12 Claims, 7 Drawing Sheets

(56) References Cited

U.S. PATENT DOCUMENTS

| | | | |
|---|---|---|---|
| 2016/0149679 A1* | 5/2016 | Frenne | H04L 5/005 370/329 |
| 2019/0394786 A1 | 12/2019 | Parron et al. | |
| 2020/0029318 A1 | 1/2020 | Guo | |
| 2020/0029340 A1* | 1/2020 | He | H04W 72/25 |
| 2020/0107297 A1* | 4/2020 | Wang | H04W 72/0446 |
| 2020/0213836 A1* | 7/2020 | Kim | H04W 8/24 |
| 2020/0267523 A1* | 8/2020 | Tang | H04L 5/0064 |
| 2020/0288431 A1* | 9/2020 | Lee | H04W 56/0015 |
| 2020/0351057 A1* | 11/2020 | Yeo | H04L 1/1854 |
| 2020/0351856 A1* | 11/2020 | Yeo | H04L 1/1861 |
| 2021/0105055 A1* | 4/2021 | Chae | H04L 5/0091 |
| 2022/0110067 A1* | 4/2022 | Ryu | H04W 24/08 |
| 2022/0272727 A1* | 8/2022 | Salim | H04L 27/2602 |
| 2023/0020105 A1* | 1/2023 | Shin | H04W 72/542 |
| 2023/0171799 A1* | 6/2023 | Guo | H04W 72/54 370/329 |
| 2024/0283617 A1* | 8/2024 | Liang | H04L 5/0053 |

FOREIGN PATENT DOCUMENTS

| | | |
|---|---|---|
| WO | WO-2018/175553 A1 | 9/2018 |
| WO | WO-2019/028900 A1 | 2/2019 |
| WO | WO-2019/091143 A1 | 5/2019 |
| WO | WO-2019/128261 A1 | 7/2019 |
| WO | WO-2020/011336 A1 | 1/2020 |
| WO | WO-2020/035142 A1 | 2/2020 |

OTHER PUBLICATIONS

Notice of Reasons for Rejection for JP Appl. No. 2022-546399, dated Sep. 12, 2023 (with English translation, 10 pages).
Extended European Search Report on EP 20896012.0 dated Jul. 13, 2023 (12 pages).
Intel Corporation, "Sharing resource pool for eNB-controlled and UE-autonomous V2V transmission modes," 3GPP TSG RAN WG1 Meeting #89; R1-1707303; May 15-19, 2017; Hangzhou, P.R. China (5 pages).
CMCC: "Considerations on V2X use cases and measurements" 3GPP TSG-RAN WG3 Meeting #101bis; R3-186033; Oct. 12, 2018; Chengdu, China (4 pages).
International Search Report and Written Opinion for PCT Appl. No. PCT/CN2020/079590 dated Dec. 21, 2020 (8 pages).
Intel Corporation, "Support of Sidelink Unicast, Groupcast, and Broadcast Modes for NR V2X Communication", 3GPP TSG RAN WG1 Meeting #94bis, R1-1810772, Oct. 12, 2018, Chengdu, China (15 pages).
Penultimate Official Action for JP Appl. No. 2022-546399, dated Mar. 1, 2024 (with English translation, 8 pages).
Spreadtrum Communications, "Discussion on resource allocation for Mode 2", 3GPP TSG RAN WG1 Ad-Hoc Meeting 1901, R1-1900705, Jan. 25, 2019, Taipei (10 pages).
First Office Action and Search Report for CN App. No. 202080098066.2 dated Oct. 21, 2024 (with English translation, 19 pages).

* cited by examiner

SYSTEM AND METHOD FOR SIDELINK CONFIGURATION

CROSS-REFERENCE TO RELATED APPLICATION

This application claims the benefit of priority under 35 U.S.C. § 120 as a continuation of PCT Patent Application No. PCT/CN2020/079590, filed on Mar. 17, 2020, the disclosure of which is incorporated herein by reference in its entirety.

TECHNICAL FIELD

The disclosure relates generally to wireless communications and, more particularly, to systems and methods for sidelink configuration.

BACKGROUND

Sidelink (SL) communication is a wireless radio communication directly between two or more user equipment devices (hereinafter "UE"). In this type of communication, two or more UEs that are geographically proximate to each other can directly communicate without going through an eNode or a base station (hereinafter "BS"), or a core network. Data transmission in sidelink communications is thus different from typical cellular network communications, which transmit data to a BS (i.e., uplink transmissions) or receive date from a BS (i.e., downlink transmissions). In sidelink communications, data is transmitted directly from a source UE to a target UE through the Unified Air Interface, e.g., PC5 interface, without passing through a BS SL communication can help save radio spectrum resources, reduce data transmission pressure on the network, reduce system resource consumption, increase spectral efficiency, reduce transmission power consumption and/or improve network operation costs.

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

In one embodiment, a method performed by a wireless communication device includes obtaining, by a first wireless communication device, information required to form a resource set report; and transmitting, by the first wireless communication device, the resource set report indicating a set of resources, wherein the set of resources are selected according to the required information.

The above and other aspects and their implementations are described in greater detail in the drawings, the descriptions, and the claims.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

DETAILED DESCRIPTION OF EXAMPLE EMBODIMENTS

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

1. Mobile Communication Technology and Environment

Figure 1A:
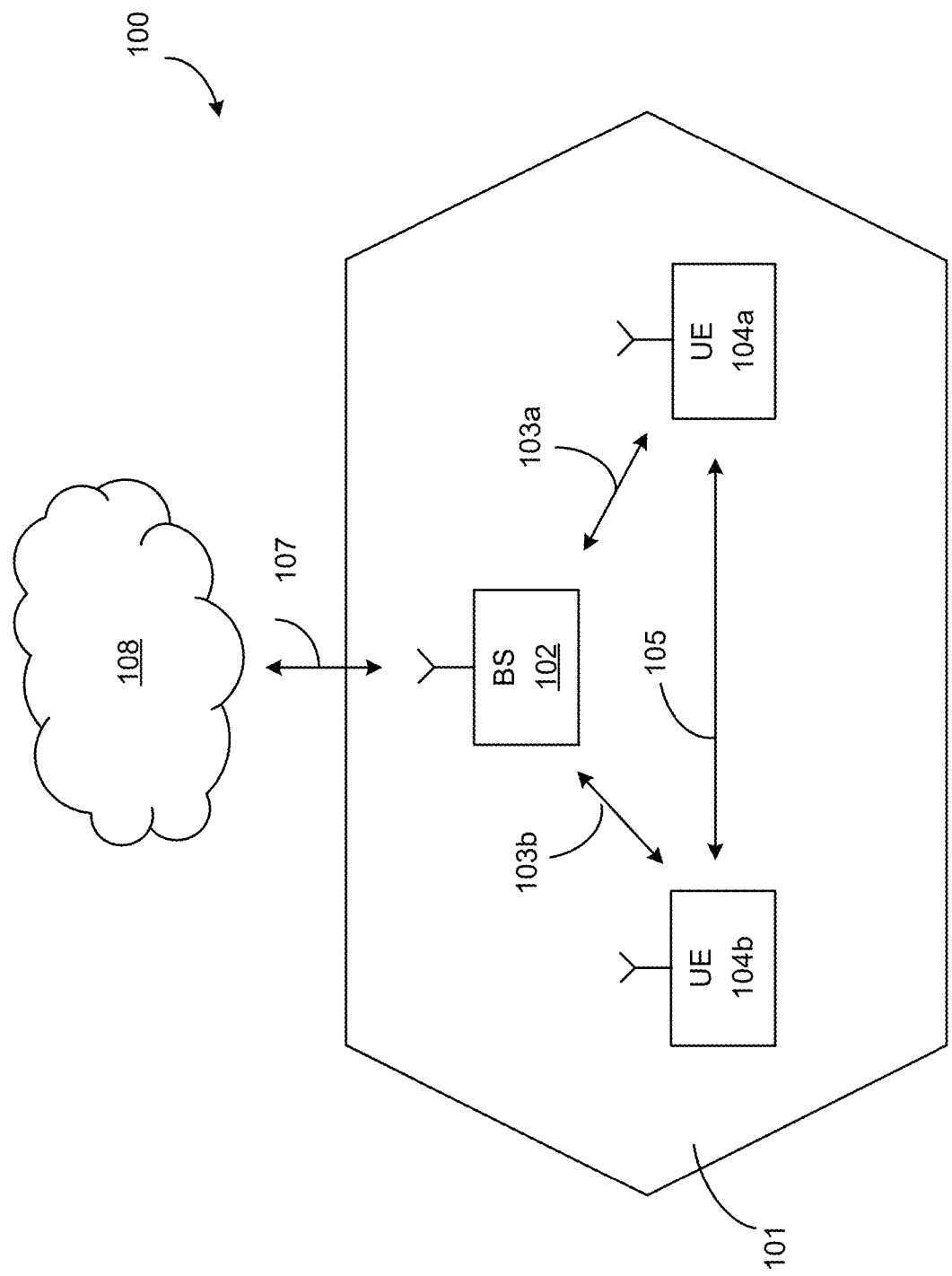
FIG. 1A illustrates an example wireless communication network, in accordance with an embodiment of the present disclosure.

Referring to FIG. 1A, an example wireless communication network 100 is shown. The wireless communication network 100 illustrates a group communication within a cellular network. In a wireless communication system, a network side communication node or a base station (BS) can include a next Generation Node B (gNB), an E-utran Node B (also known as Evolved Node B, eNodeB or eNB), a pico station, a femto station, a Transmission/Reception Point (TRP), an Access Point (AP), a Multi-cell Coordinating Entity (MCE), a Gateway (GW), a Mobility Management Entity (MME), an Evolved Universal Terrestrial Radio Access Network (EUTRAN), a Next Generation Radio Access Network (NG-RAN), Operations, Administration and Management (OAM) or the like. A terminal side node or a user equipment (UE) can include a long range communication system such as, for example, a mobile device, a smart phone, a personal digital assistant (PDA), a tablet, a laptop computer, or a short range communication system such as, for example a wearable device, a vehicle with a vehicular communication system, or the like. In FIG. 1A, a network side and a terminal side communication node are represented by a BS 102 and a UE 104a or 104b, respectively, and in the embodiments in this disclosure hereafter. In some embodiments, the BS 102 and UE 104a/104b are sometimes referred to as "wireless communication node" and "wireless communication device," respectively. Such communication nodes/devices can perform wireless and/or wired communications.

In the illustrated embodiment of FIG. 1A, the BS 102 can define a cell 101 in which the UEs 104a-b are located. The UE 104a can include a vehicle that is moving within a coverage of the cell 101. The UE 104a can communicate with the BS 102 via a communication channel 103a. Similarly, the UE 104b can communicate with the BS 102 via a communication channel 103b. In addition, the UEs 104a-b can communicate with each other via a communication channel 105. The communication channels (e.g., 103a-b) between the UE and the BS can be through interfaces such as an Uu interface, which is also known as UMTS (Universal Mobile Telecommunication System (UMTS) air interface. The communication channels (e.g., 105) between the UEs can be through a PC5 interface, which is introduced to address high moving speed and high density applications such as, for example, Vehicle-to-Vehicle (V2V) communications, Vehicle-to-Pedestrian (V2P) communications, Vehicle-to-Infrastructure (V2I) communications, Vehicle-to-Network (V2N) communications, or the like. In some instances, such car network communications modes can be collective referred to as Vehicle-to-Everything (V2X) communications. It is appreciated that the communications channels between the UEs can be used in Device-to-Device (D2D) communications while remaining within the scope of the present disclosure. The BS 102 is connected to a core network (CN) 108 through an external interface 107, e.g., an Iu interface.

Figure 1B:
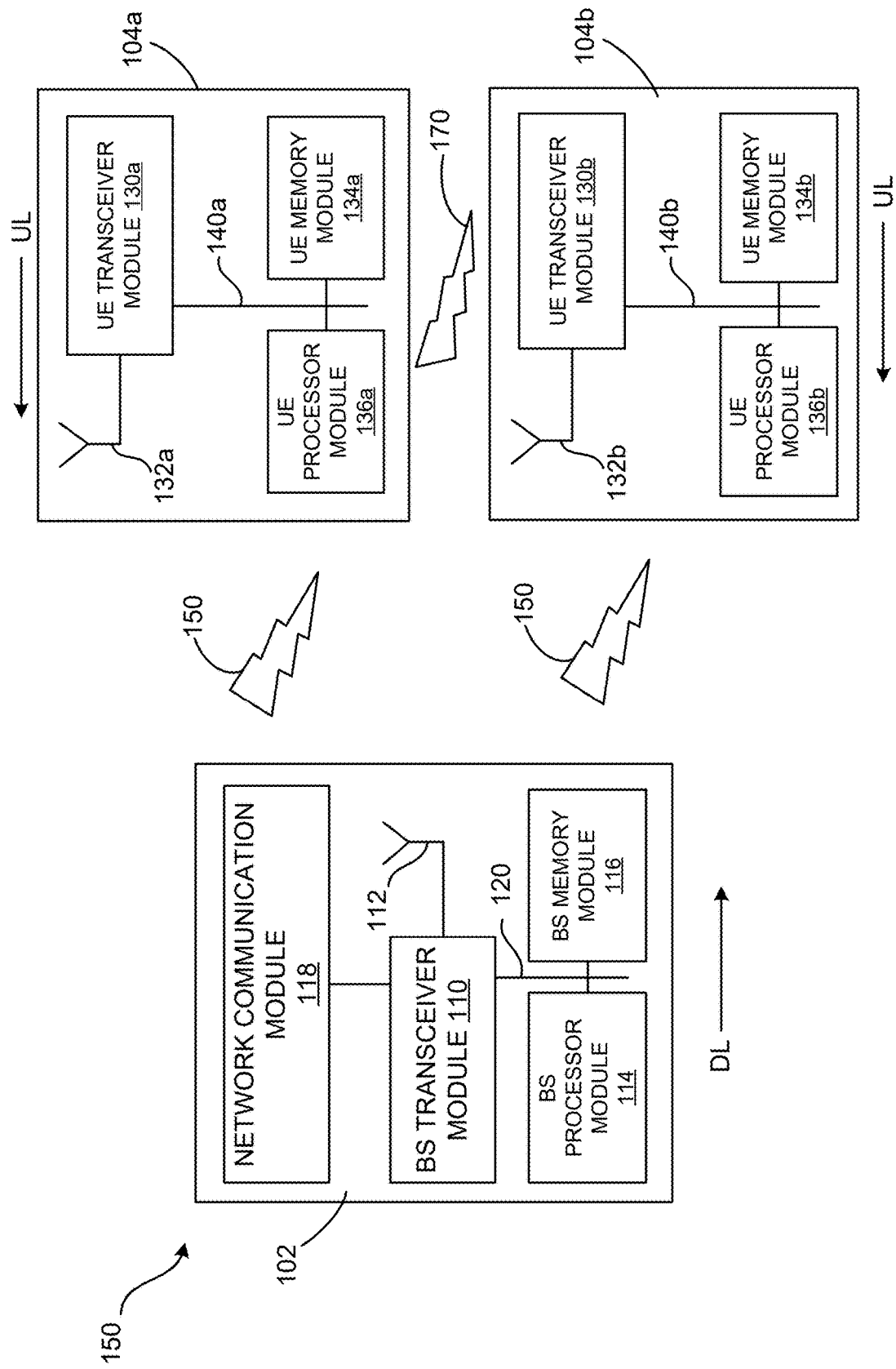
FIG. 1B illustrates a block diagram of an example wireless communication system for transmitting and receiving downlink, uplink, and/or sidelink communication signals, in accordance with some embodiments of the present disclosure.

FIG. 1B illustrates a block diagram of an example wireless communication system 150 for transmitting and receiving downlink, uplink and sidelink communication signals, in accordance with some embodiments of the present disclosure. The system 150 may include components and elements configured to support known or conventional operating features that need not be described in detail herein. In one embodiment, the system 150 can transmit and receive data symbols in a wireless communication environment such as the wireless communication network 100 of FIG. 1A, as described above.

The system 150 generally includes the BS 102 and UEs 104a-b, as described in FIG. 1A. The BS 102 includes a BS transceiver module 110, a BS antenna 112, a BS memory module 116, a BS processor module 114, and a network communication module 118, each module being coupled and interconnected with one another as necessary via a data communication bus 120. The UE 104a includes a UE transceiver module 130a, a UE antenna 132a, a UE memory module 134a, and a UE processor module 136a, each module being coupled and interconnected with one another as necessary via a data communication bus 140a. Similarly, the UE 104b includes a UE transceiver module 130b, a UE antenna 132b, a UE memory module 134b, and a UE processor module 136b, each module being coupled and interconnected with one another as necessary via a data communication bus 140b. The BS 102 communicates with the UEs 104a-b via one or more of a communication channel 150, which can be any wireless channel or other medium known in the art suitable for transmission of data as described herein.

As would be understood by persons of ordinary skill in the art, the system 150 may further include any number of modules other than the modules shown in FIG. 1B. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software depends upon the particular application and design constraints imposed on the overall system. Those familiar with the concepts described herein may implement such functionality in a suitable manner for each particular application, but such implementation decisions should not be interpreted as limiting the scope of the present disclosure.

A wireless transmission from an antenna of one of the UEs 104a-b to an antenna of the BS 102 is known as an uplink transmission, and a wireless transmission from an antenna of the BS 102 to an antenna of one of the UEs 104a-b is known as a downlink transmission. In accordance with some embodiments, each of the UE transceiver modules 130a-b may be referred to herein as an uplink transceiver, or UE transceiver. The uplink transceiver can include a transmitter and receiver circuitry that are each coupled to the respective antenna 132a-b. A duplex switch may alternatively couple the uplink transmitter or receiver to the uplink antenna in time duplex fashion. Similarly, the BS transceiver module 110 may be herein referred to as a downlink transceiver, or BS transceiver. The downlink transceiver can include RF transmitter and receiver circuitry that are each coupled to the antenna 112. A downlink duplex switch may alternatively couple the downlink transmitter or receiver to the antenna 112 in time duplex fashion. The operations of the transceivers 110 and 130a-b are coordinated in time such that the uplink receiver is coupled to the antenna 132a-b for reception of transmissions over the wireless communication channel 150 at the same time that the downlink transmitter is coupled to the antenna 112. In some embodiments, the UEs 104a-b can use the UE transceivers 130a-b through the respective antennas 132a-b to communicate with the BS 102 via the wireless communication channel 150. The wireless communication channel 150 can be any wireless channel or other medium known in the art suitable for downlink (DL) and/or uplink (UL) transmission of data as described herein. The UEs 104a-b can communicate with each other via a wireless communication channel 170. The wireless communication channel 170 can be any wireless channel or other medium known in the art suitable for sidelink transmission of data as described herein.

Each of the UE transceiver 130a-b and the BS transceiver 110 are configured to communicate via the wireless data communication channel 150, and cooperate with a suitably configured antenna arrangement that can support a particular wireless communication protocol and modulation scheme. In some embodiments, the UE transceiver 130a-b and the BS transceiver 110 are configured to support industry standards such as the Long Term Evolution (LTE) and emerging 5G standards, or the like. It is understood, however, that the present disclosure is not necessarily limited in application to a particular standard and associated protocols. Rather, the UE transceiver 130a-b and the BS transceiver 110 may be configured to support alternate, or additional, wireless data communication protocols, including future standards or variations thereof.

The processor modules 136a-b and 114 may be each implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 114 and 136a-b, respectively, or in any practical combination thereof. The memory modules 116 and 134a-b may be realized as RAM memory, flash memory, ROM memory, EPROM memory, EEPROM memory, registers, a hard disk, a removable disk, a CD-ROM, or any other form of storage medium known in the art. In this regard, the memory modules 116 and 134a-b may be coupled to the processor modules 114 and 136a-b, respectively, such that the processors modules 114 and 136a-b can read information from, and write information to, memory modules 116 and 134a-b, respectively. The memory modules 116 and 134a-b may also be integrated into their respective processor modules 114 and 136a-b. In some embodiments, the memory modules 116 and 134a-b may each include a cache memory for storing temporary variables or other intermediate information during execution of instructions to be executed by processor modules 114 and 136a-b, respectively. Memory modules 116 and 134a-b may also each include non-volatile memory for storing instructions to be executed by the processor modules 114 and 136a-b, respectively.

The network interface 118 generally represents the hardware, software, firmware, processing logic, and/or other components of the BS 102 that enable bi-directional communication between BS transceiver 110 and other network components and communication nodes configured to communication with the BS 102. For example, the network interface 118 may be configured to support internet or WiMAX traffic. In a typical deployment, without limitation, the network interface 118 provides an 802.3 Ethernet interface such that BS transceiver 110 can communicate with a conventional Ethernet based computer network. In this manner, the network interface 118 may include a physical interface for connection to the computer network (e.g., Mobile Switching Center (MSC)). The terms "configured for" or "configured to" as used herein with respect to a specified operation or function refers to a device, component, circuit, structure, machine, signal, etc. that is physically constructed, programmed, formatted and/or arranged to perform the specified operation or function. The network interface 118 can allow the BS 102 to communicate with other BSs or core network over a wired or wireless connection.

In some embodiments, each of the UEs 104a-b can operate in a hybrid communication network in which the UE communicates with the BS 102, and with other UEs, e.g., between 104a and 104b. As described in further detail below, the UEs 104a-b support sidelink communications with other UE's as well as downlink/uplink communications between the BS 102 and the UEs 104a-b. In general, the sidelink communication allows the UEs 104a-b to establish a direct communication link with each other, or with other UEs from different cells, without requiring the BS 102 to relay data between UEs.

In general, the allocation of SL communication resources is based on "resource pools", formed by: a "slot/subframe pool" in time domain, including slots/subframes which can be used for the sidelink, and a "resource blocks pool" in frequency domain, including the resource blocks that can be used for to the SL. In some embodiments, the minimum resource unit in time domain may be a symbol, including Cyclic Prefix-Orthogonal Frequency Division Multiplex (CP-OFDM) and Discrete Fourier Transform Spread OFDM (DFT-S-OFDM). Further, a basic resource unit in time domain may be a slot, which may contain 12 symbols for extended cyclic prefix (ECP) or 14 symbols for normal cyclic prefix (NCP). In a slot within a SL resource pool, part of the symbols or all of the symbols of the slot may be configured as a SL resource. In the frequency domain, the minimum resource unit is a sub-carrier. In some embodiments, each sub-carrier may contain 15 kHz, 30 kHz, 60 kHz, 120 kHzz or 240 kHz. Multiple sub-carriers in a slot (for example, a slot including 12 sub-carriers, 24 sub-carriers or the like) may be referred to as a resource block (RB). In the frequency domain, part of the system bandwidth may be assigned as a SL resource.

The SL resource pool may include one or more slots in the time domain, and one or more RBs in the frequency domain. The slots contained in a SL resource pool may be continuous or discontinuous. The RBs contained in a SL resource pool may be continuous or discontinuous.

Two types of resource pools are defined for transmission and reception: a transmission (Tx) resource pool includes the candidate resources that may be used for UE's SL Tx, and a receiving (Rx) resource pool includes the candidate resources that UE may use to detect/receive other UE's SL signal. A SL resource pool includes resources used for at least one of the following: SL control, data, and feedback information. The resource pool may be configured by the network side through high layer signaling or system pre-configuration. UEs can support multiple resource pools interleaved in time domain.

A SL resource pool includes one or more types of the following resources: physical sidelink control channel (PSCCH), which may be used for SL control information, physical sidelink shared channel (PSSCH), which may be used for SL data transmission, and physical sidelink feedback channel (PSFCH), which may be used for SL feedback information transmission. The UE may use a PSCCH resource to send a first stage SL control information ($1^{st}$ stage SCI) message, which may be used to indicate a second stage SCI ($2^{nd}$ stage SCI) configuration and/or relevant PSSCH resource allocation and other associated control information. The UE may use a PSSCH resource to send SL data and/or the $2^{nd}$ stage SCI. The UE may use a PSFCH resource to send SL ACK/NACK information.

When UEs communicate on SL, transmitting UE (Tx UE) selects SL resources within a resource pool without any information from receiving UE (Rx UE). Tx UE may use SL resources within assigned resource pools according to the scheduling that the Tx UE determines, or that the network determines. In the situation where the Tx UE selects SL resources, Tx UE performs sensing within the SL resource pool to select resources with less conflict and higher quality. For example, if Tx UE needs to use two sub-channels as PSSCH resources to transmit its SL data, then Tx UE may use two sub-channels as candidate resource size to measure all the available sub-channels in a resource pool. Subsequently, Tx UE may select a suitable resource for its SL transmission. During the sending and resource selecting processes, Tx UE is limited to measuring the channel status that Tx UE senses; in other words, Tx UE does not consider the situation of Rx UE. Thus, the resources selected using traditional SL resource schemes may be less efficient.

The present disclosure is concerned with the Rx UE creating a resource report, the resource report may be used by the Tx UE to assist its SL communication.

2. Creating a Resource Report Scheme

Figure 2:
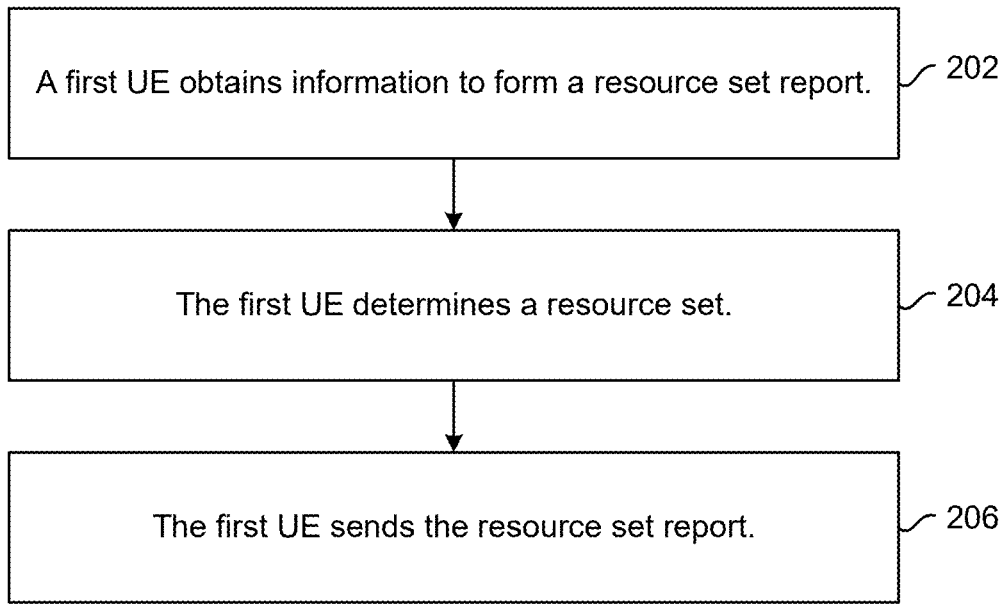
FIG. 2 illustrates a flow chart of an exemplary method of a UE creating a resource report scheme, in accordance with some embodiments of the present disclosure.

FIG. 2 illustrates a flow chart of an exemplary method of a UE creating a resource set report scheme to be used in SL communication, in accordance with some embodiments of the present disclosure. In some embodiments, a first UE may create a resource set report to be used in SL communication. At block 202, the first UE obtains information to form a resource set report. In block 204, a resource set may be determined by the first UE, by determining resources that satisfy the requirements according to the information received by the first UE. In block 206, the first UE sends the resource set report. The resource set report may be sent to a second UE, to a base station, or be sent using broadcast, or groupcast on SL. In some embodiments, the first UE may be a Rx UE and the second UE may be an Tx UE on SL.

In some embodiments, the first UE may obtain the information to form a resource set report from the second UE. In some embodiments, the first UE may obtain the information to form a resource set report by system configuration/pre-configuration. In some embodiments, the first UE may obtain the information to form a resource set report by network configuration/pre-configuration. The information to form a resource set report contains the requirements of the resource set report and may include Type A and/or Type B configurations.

In a Type A configuration, the first UE obtains information required to form a resource set report. The first UE subsequently transmits the resource set report, where the resource set report indicates a set of candidate resources and the set of resources are selected according to the required information. The candidate resources may be considered to be used by the second UE for its SL transmission.

In a Type B configuration, the first UE obtains information required to form a resource set report. The first UE subsequently transmits the resource set report, where the resource set report indicates a set of blacklist resources and the set of resources are selected according to the required information. The blacklist resources may be considered not to be used by the second UE for its SL transmission.

In some embodiments, the Type A or Type B configuration may indicate a configuration. The configuration may include one or more resource pools from which the set of resources may be selected. The one or more resource pools may be indicated by respective indices of a list included in the configuration indicated in the Type A or Type B configuration.

In some embodiments, the Type A or Type B configuration may indicate a configuration. The configuration may include one or more sets of sensing parameters or one or more sets of criteria. In the Type A configuration, the one or more sets of sensing parameters may be configured to measure the set of resources in the one or more resource pools. The one or more sets of sensing parameters may be indicated by respective indices of a list included in the configuration indicated in the Type A configuration. In the Type B configuration, the one or more sets of criteria may be configured to select the set of resources in the one or more resource pools. The one or more sets of criteria may be indicated by respective indices of a list included in the configuration indicated in the Type B configuration.

In some embodiments, the Type A or Type B configuration may indicate a configuration. The configuration may indicate one or more formats of the resource set report. The one or more formats of the resource set report may be indicated by respective indices of a list included in the configuration indicated in the Type A or Type B configuration.

In some embodiments, the Type A or Type B configuration may indicated a configuration. The configuration may indicate one or more resources assigned for transmitting the resource set report.

In some embodiments, a first UE receives the information to form a resource set report through Radio Resource Control (RRC) messages, SCI and/or MAC layer signaling (e.g., MAC CE). In some embodiments, the first UE may receive the information on SL (i.e., using SL resources to receive the configuration). In some embodiments, the first UE may receive the information via a groupcast (multi-cast) in a SL group in which only member UEs of the group can receive the information. In some embodiments, the first UE may receive the information via unicast from a second UE. In some embodiments, the first UE can obtain the information from a base station by configuration. In some embodiments, the first UE can obtain the information by system pre-configuration.

Figure 3:
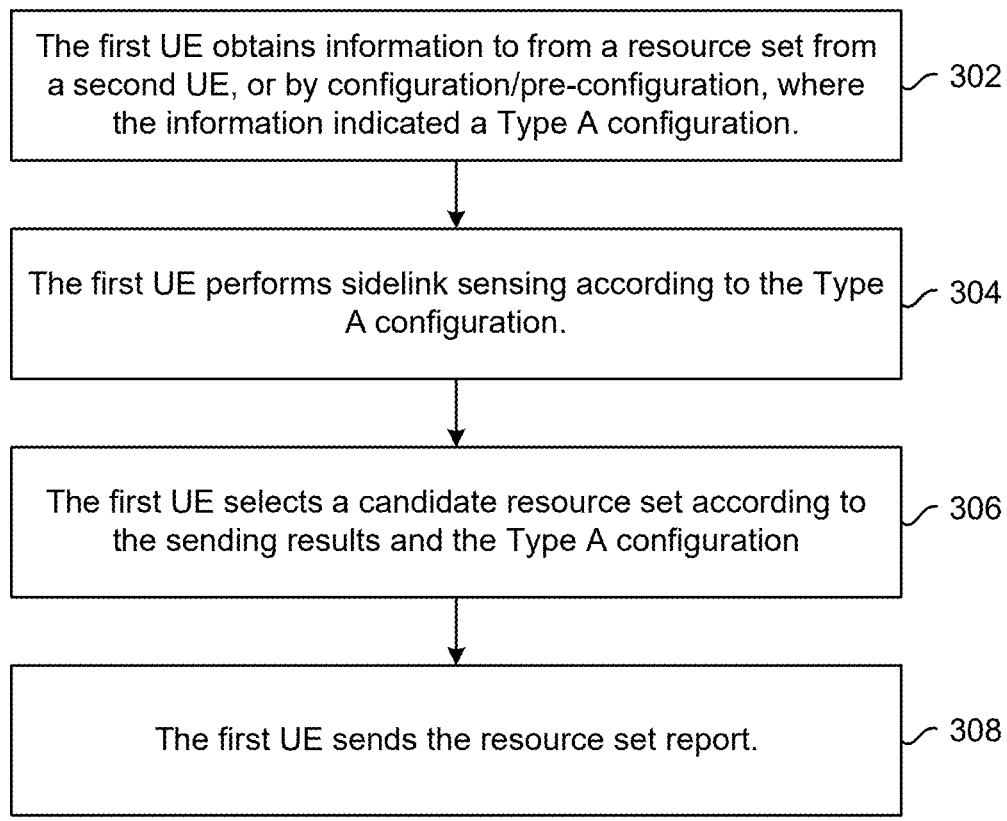
FIG. 3 illustrates a flow chart of an exemplary method of creating a resource set report based on a Type A configuration, in accordance with some embodiments of the present disclosure.

FIG. 3 illustrates a flow chart of an exemplary method of creating a resource set report based on a Type A configuration, in accordance with some embodiments of the present disclosure. In block 302, a first UE obtains information to form a resource set from a second UE or by configuration/pre-configuration, where the information indicates a Type A configuration. In block 304, the first UE performs SL sensing according to the Type A configuration. During sensing, the first UE may measure the SL resources determined by the Type A configuration and select suitable resources given the demands of the second UE. In block 306, the first UE may select a candidate resource set based on the results of sensing and the Type A configuration. In block 308, the first UE may send a resource set report, based on the candidate resource set. The resource set report may be sent to the second UE, or be sent using broadcast, or groupcast on SL.

Figure 4:
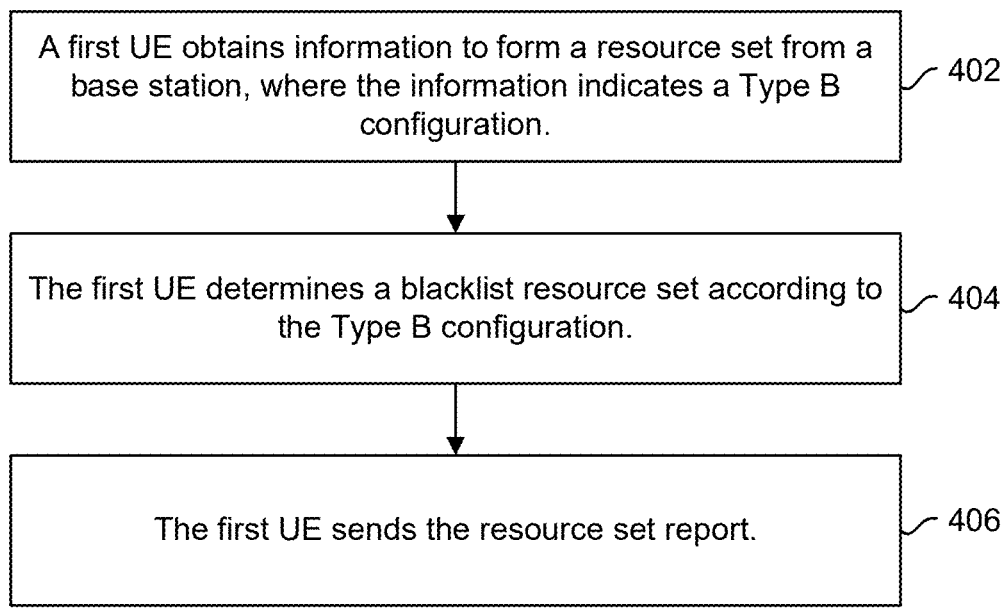
FIG. 4 illustrates a flow chart of an exemplary method of creating a resource set report based on a Type B configuration, in accordance with some embodiments of the present disclosure.

FIG. 4 illustrates a flow chart of an exemplary method of creating a resource set report based on a Type B configuration, in accordance with some embodiments of the present disclosure. In block 402, a first UE obtains information to form a resource set from a base station, where the information indicates a Type B configuration. In block 404, the first UE determines a blacklist resource set according to the Type B configuration. In block 406, the first UE sends a resource set report based on the blacklisted resource set. The resource set report may be sent to the second UE, to the base station, or be sent using broadcast, or groupcast on SL.

2.1 Type A Configurations

Type A configurations may be used to indicate that a first UE may perform SL resource sensing and report a candidate resource set. The candidate resource set includes resources which may be more suitable for the second UE to transmit information on SL. For example, the first UE may perform SL sensing according to the Type A configuration. During sensing, the first UE may measure the SL resources according to the Type A configuration and select suitable resources given the demands of the second UE. Subsequently, the first UE may transmit a resource report set.

In some embodiments, Type A configurations may include at least one of the following: a configuration of sensing resource pool, a configuration of sensing parameters, a configuration of a resource set report format, and/or a configuration of resources for the resource set report.

2.2 The Configuration of the Sensing Resource Pool

The Type A configuration may include the configuration of the sensing resource pool. The configuration of the sensing resource pool may assign one or more SL resource pools which can be used for sensing. The configuration of each resource pool may include: resource pool period, slots included in one period, symbol allocation within a slot, RBs included in the resource pool, sub-channel size, PSCCH resource units, and/or PSSCH Demodulation Reference Signal (PSSCH DMRS) pattern(s). The resource pool assigned by the configuration of sensing resource pools is a SL resource pool which may contain PSCCH, PSSCH and/or PSFCH resources. The assigned resource pool may be a transmitting resource pool of the second UE, a receiving resource pool of the second UE, a receiving resource pool of the first UE, and the like. According to the configuration of the sensing resource pool, the first UE may perform sensing on the assigned resource pool(s). Specifically, for example, when the first UE receives more than one configured sensing resource pools, the first UE may perform sensing on one or more resource pools of the assigned resource pools.

In some embodiments, the first UE may receive more than one configured resource pool as a sensing resource pool. In these situations, the assigned resource pools may be set as a sensing resource pool list. In the sensing resource pool list, each resource pool has a unique resource pool index. By indicating the resource pool index, the UEs may identify the corresponding resource pool in the sensing resource pool list.

2.3 The Configuration of the Sensing Parameter

The Type A configuration may include the configuration of the sensing parameter. Sensing parameters may be determined according to the SL data transmission requirements of the second UE, the Tx UE. These sensing parameters may subsequently be used for selecting resources for SL data transmission. The present disclosure uses the sensing parameters determined by the second UE, the Tx UE, via the Type A configuration, during sensing in the first UE, the Rx UE. Sensing parameters may be used by the first UE to perform SL resource sensing during the first UE's sensing procedures on the assigned resource pool(s). According to the result of sensing, the first UE may select candidate resource(s) which satisfy the requirement of the second UE, but may be more suitable for the first UE. The selected candidate resource(s) may be PSCCH and/or PSSCH resource(s) in the resource pool. The selected candidate resources corresponding to one set of sensing parameters may be called a resource set.

The sensing parameter may include one or more sets of sensing parameters. One set of the sensing parameters may include at least one of the following: candidate resource period, candidate resource size, priority, Reference Signal Received Power (RSRP) threshold, retransmission number, retransmission interval, quantity of candidate resources in a resource set, quantity of resources for one service, and/or a time window.

The candidate resource period may indicate the period of the resource selected by the first UE. In other words, multiple resources with assigned periods may be marked as candidate resources. In some embodiments, the candidate resource period may be the period of data which the second UE, the Tx UE, needs to transmit on SL.

Figure 5:
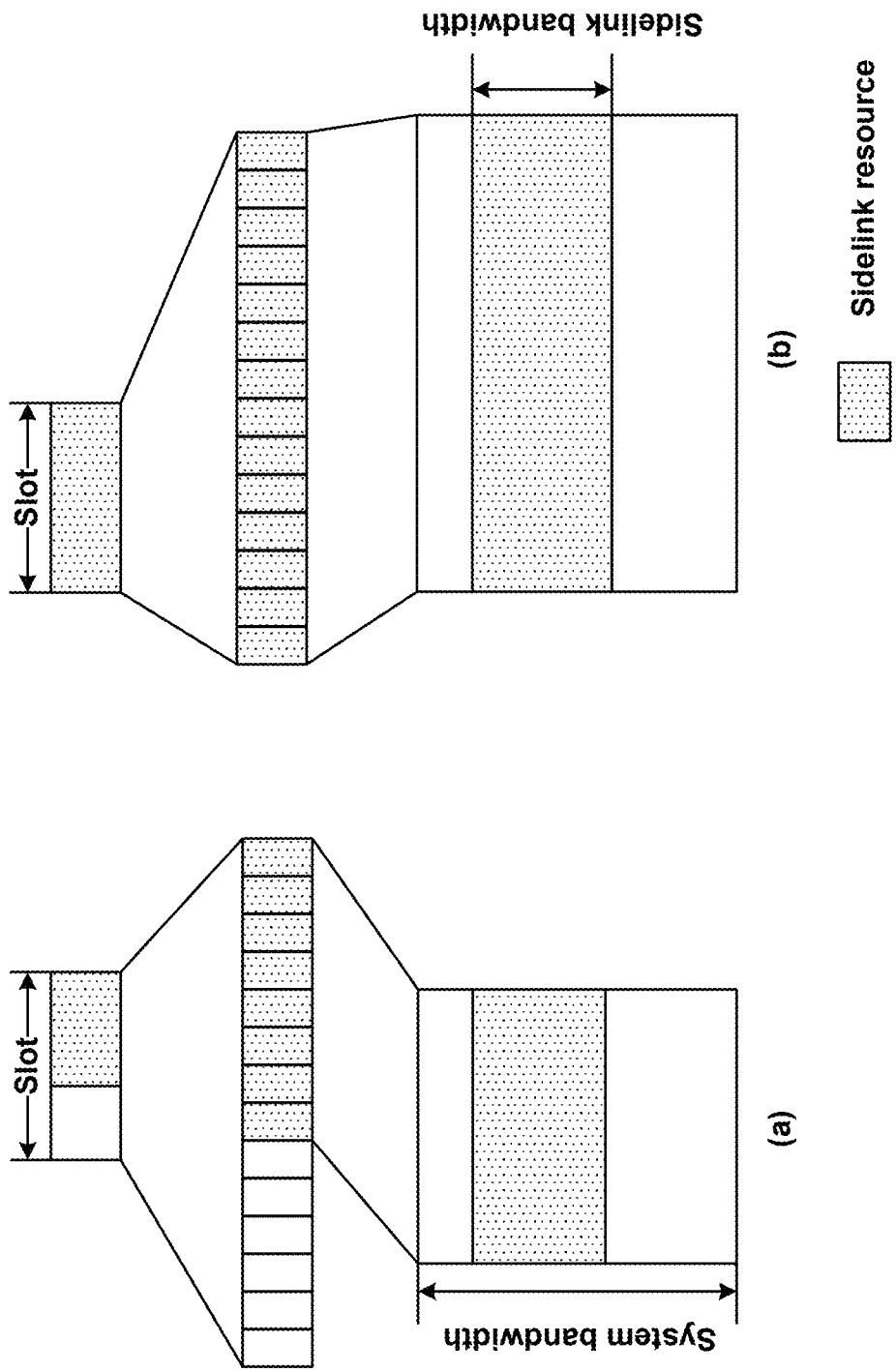
FIG. 5 illustrates a schematic diagram of an exemplary configuration of a sidelink resource pool.

The candidate resource size may indicate the number of sub-channels used as one candidate resource of PSSCH. See for example, FIG. 5. FIG. 5 illustrates a schematic diagram of an exemplary configuration of a sidelink resource pool. Case (a) shows the configuration that part of the symbol in a slot is assigned as a SL resource. Case (b) shows the configuration that all of the symbols in a slot are assigned as a SL resource.

Figure 6:
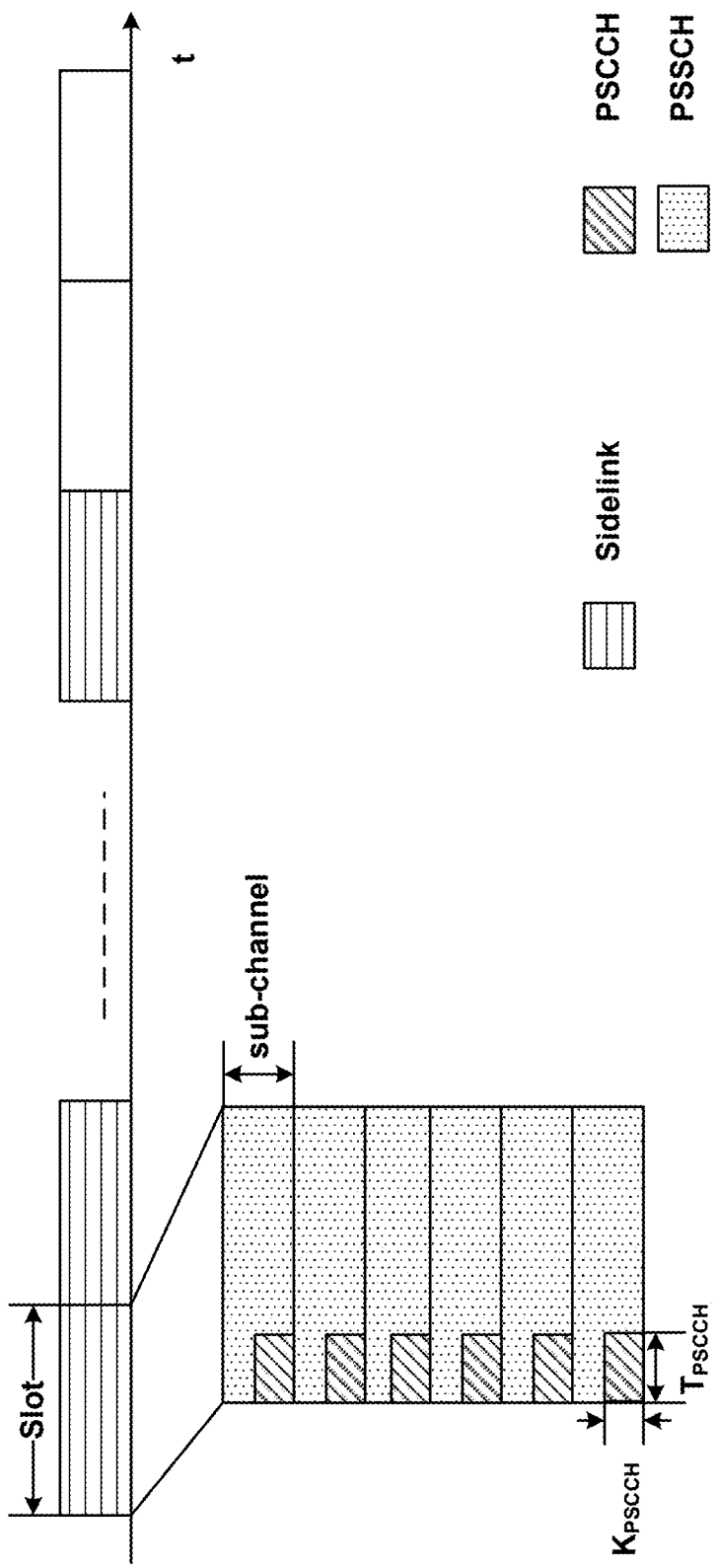
FIG. 6 illustrates a schematic diagram of an exemplary configuration of a sidelink resource pool.

FIG. 6 illustrates a schematic diagram of an exemplary configuration of a sidelink resource pool. In this configuration, a sub-channel is used as a basic RB for PSSCH resources in the frequency domain. Each sub-channel includes k contiguous RBs, where k is an integer. A PSSCH resource may include one or more sub-channels. Within each sub-channel, there is a PSSCH resource which occupies several symbols and RBs.

In the present disclosure, the assigned number of sub-channels may be bundled as a PSSCH resource unit during the sensing process. In some embodiments, the candidate resource size may be determined according to the data packet size of the second UE, the Tx UE.

The priority may indicate the data priority of the second UE, the Tx UE. The priority may be used by the first UE during sensing process to determine whether a resource may be selected as a candidate resource, or whether that resource may be reserved for a resource to be transmitted, instead of a candidate resource.

The RSRP threshold may set the power threshold of DMRS of PSSCH during the sensing process. In some embodiments, the RSRP threshold may be determined by the second UE, the Tx UE.

The retransmission number may indicate the potential retransmission attempts of one data packet of the second UE, the Tx UE. In some embodiments, the retransmission number may be the maximum number of retransmission attempts for a data packet.

The retransmission interval may indicate the slot interval between two adjacent transmissions of the same data packet.

The quantity of candidate resources in a resource set may indicate the number or ratio of resources that may be selected in one resource set. In situations where the quantity of candidate resources in a resource set is a number, the first UE may select the indicated number of candidate resources to be included in a resource set. In situations where the quantity of candidate resources in a resource set is a ratio, the first UE may select candidate resources out of all available resources to achieve the assigned ratio. In some embodiments, the first UE may select an assigned number or ratio of PSSCH resources as candidate resources in a resource set. The PSCCH resources corresponding to the selected PSSCH resources may also be contained in the resource set.

The quantity of resources for one service indicates the quantity of resources which can be used for data packets of a same service. For example, semi persistent scheduling (SPS) services indicate the quantity of resource for multiple data packets within a certain period.

The time window may indicate the slots in the time-domain corresponding to the candidate resources.

In some embodiments, more than one set of sensing parameters may be configured in the Type A configuration. In these situations, the sensing parameter sets may be marked as a sensing parameter set list. In a sensing parameter set list, each sensing parameter has a unique index. By indicating the sensing parameter set index, the UEs may identify the corresponding sensing parameter set in the sensing parameter set list.

In the case that multiple sensing parameter sets are configured, the first UE may perform sensing and select candidate resource(s) respectively, determining multiple resource sets according to the sensing parameter sets. Further, the resource sets may be marked as a resource set list. In a resource set list, each resource has a unique index. By indicating the resource set index, the UEs may identify the corresponding resource sets in the resource set list. In some embodiments, the resource set index has a one-to-one relationship with the sensing parameter set index. For example, the first UE may perform sensing according to sensing parameter set index #k, and composes the candidate resources selected based on the sensing parameters into the resource set index #k.

In some embodiments, the resource set index may be implicitly identified with the corresponding sensing parameter set index. In other words, there is no resource set index. In these situations, the reported resource set may correspond with the sensing parameter index.

2.4 Exemplary Embodiment #1

Figure 7:
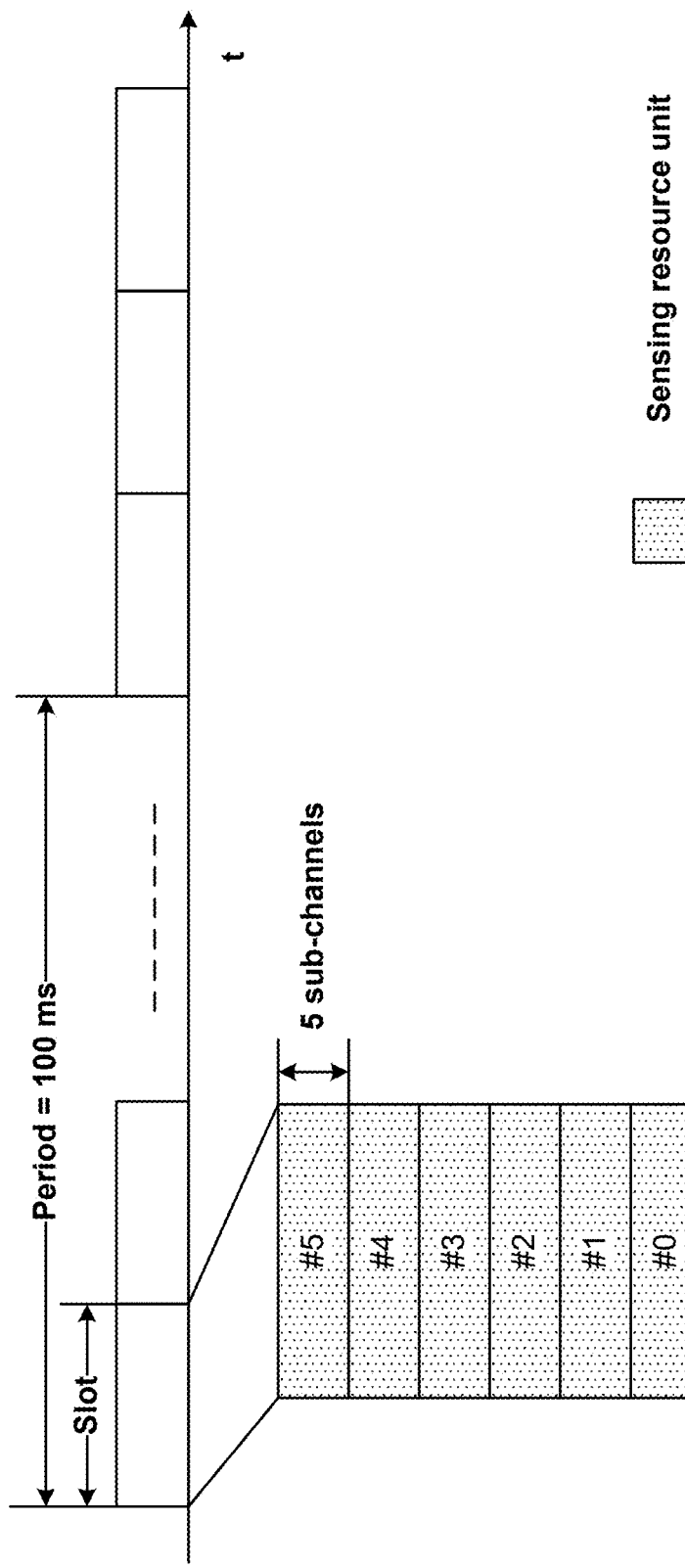
FIG. 7 illustrates an example implementation of a first UE performing sensing on an assigned resource pool according to indicated sensing parameters, in accordance with exemplary embodiment #1 of the present disclosure.

FIG. 7 illustrates an example implementation of a first UE performing sensing on an assigned resource pool according to indicated sensing parameters, in accordance with exemplary embodiment #1 of the present disclosure. In the present example, the first UE receives the Type A configuration with the configuration of one sensing parameter set. The first UE may receive the Type A configuration from a second UE. The sensing parameters set in the Type A configuration is indicated as: candidate resource period=100 ms, candidate resource size=5 sub-channels, priority level=3, retransmission number=0 (i.e., no retransmissions), and quantity of candidate resources in a resource set=4. Subsequently, the first UE performs sensing on the assigned resource pool using the indicated sensing parameters. As illustrated in FIG. 7, the first UE sets 5 sub-channels as a sensing resource unit with a 100 ms period. By sensing on the resource pool based on the sensing resource unit and the priority level, the first UE selects 4 candidate resources with better channel quality to be included in the resource set.

2.5 Exemplary Embodiment #2

In one example, a first UE receives a Type A configuration with the configuration of a sensing parameter set list which includes two sensing parameter sets. According to the configuration, the sensing parameter set index #0 and #1 have independent configurations of sensing parameters. For the index #0 sensing parameter set, the set of sensing parameters includes: candidate resource period=100 ms, candidate size=5 sub-channels. For the index #1 sensing parameter set, the set of sensing parameters includes: candidate resource period=0; candidate resource size=10 sub-channels. The first UE may receive the Type A configuration from a second UE.

Subsequently, the first UE may perform sensing on the assigned resource pool using the sensing parameters of each sensing parameter set respectively. According to set index #0, the first UE sets 5 sub-channels as a sensing resource unit with 100 ms period and selects candidate resources to compose the resource set. According to set index #1, the first UE sets 10 sub-channels as a sensing resource unit and selects candidate resources to compose the resource set #1.

2.6 The Configuration of the Resource Set Report Format

The Type A configuration may include the configuration of the resource set report format. A resource set report format may include at least one of the following: the required resource set and/or the transmission type of resource set report. The first UE may obtain the configuration of the resource set report formats through RRC signals, SCI, and/or MAC layer signaling (e.g., MAC CE) which may trigger the resource set report process. In some embodiments, the first UE may receive the resource set report format indication in the $1^{st}$ stage SCI. For example, using the reserved bit(s) in the first stage SCI to indicate the resource set report format index. In some embodiments, the first UE may receive the resource set report format indication in the $2^{nd}$ stage SCI. For example, defining a new $2^{nd}$ stage SCI format to indicate one or more resource set report format indices, or to indicate the required resource set and the type of resource set report.

In some embodiments, more than one resource set report formats may be configured. In these situations, the set report formats may be marked as a resource set report format list. In a resource set report format list, each resource set report format has a unique index. By indicating the resource set report format index, the UEs may identify the corresponding resource set format report in the resource set report format list. In some embodiments, multiple resource sets are indicated in a resource set report format and the type of the resource set report may be configured for each resource set respectively.

Where the resource set report format indicates a required resource set, the first UE may report the specified resource set. To indicate the required resource set, the resource set index may be used to identify the target resource set(s), or, a bitmap sequence may be used to indicate the target resource sets in a resource set list one-by-one. In some embodiments, the required resource set may use one bit to indicate whether or not that required resource set needs to be reported to the second UE, the Tx UE.

Where the resource set report format includes the transmission type of the resource set report, the first UE may send a resource set report periodically or by one-shot. In the situation where the resource set report is configured to be reported periodically, the first UE may send the assigned resource set report with the specified period. Between periods, the first UE may update the resource set report based on the latest sensing results. In the situation where the resource set report is configured as one-shot reporting, the first UE may send the assigned resource set report for one time.

In some embodiments, multiple resource sets are indicated in a resource set report format, the type of resource set report may be configured for each resource set respectively.

2.7 Exemplary Embodiment #3

In one example, the first UE obtains a Type A configuration from a second UE through RRC signaling. The Type A configuration indicates the configuration of the resource set report format. In this example, the first UE receives an assigned bitmap sequence with five bits to indicate five corresponding resource sets (i.e., there is a one-to-one mapping relationship between the bitmap sequence and the related resource sets). The second UE may have assigned the bitmap sequence. In this example, the type of resource set report is configured as periodical reporting with period=200 ms.

According to the configuration, the first UE may report the resource set indicated by the bitmap with period=200 ms. For example, for the bitmap marked as "11000", the first UE may report the resource set index #0 and #1. The first UE may update the selected resource sets based on the latest sensing results, and report the updated resource sets in the next reporting period.

2.8 The Configuration of Resources for the Resource Set Report

The Type A configuration may include the configuration of resources for the resource set report. The configuration of resources for the resource set report may indicate one or more SL resources for carrying the resource set report. In response to the configuration, the first UE may send the resource set report to a second UE on SL. The second UE may allocate SL resources to bear the resource set report. The indicated resources for the resource set report may be PSCCH and/or PSSCH resources.

In one embodiment, the configured resources for the resource set report may be one-shot resources which contain one or more resources for reporting resource set reports one time. In other embodiments, the configured resources for the resource set report may be periodical resource which contain resource with certain periods for periodical resource set reports.

The first UE may receive the configuration of the resources for the resource report through RRC signaling and/or SCI. By using RRC signaling, the configured grant may be used to assign the resource for the resource set report, including configured grant type 1 and/or type 2. By using SCI, the first UE may use the resources for the resource set report which is assigned in the $1^{st}$ stage SCI and/or $2^{nd}$ stage SCI. In some embodiments, by using SCI, the first UE may use a PSSCH retransmission resource of the second UE's data packet as the resource for the resource set report.

2.9 Exemplary Embodiment #4

In one example, a first UE receives a Type A configuration from a second UE through SCI, the configuration indicating the configuration of resources for the resource set report. In the $1^{st}$ stage SCI, PSCCH and relevant PSSCH are assigned to carry the resource set report for one-shot transmission. In other words, the indication of the Type A configuration using SCI can be seen as a trigger signal where the second UE, the Tx UE, triggers the first UE, the Rx UE, to start the resource set report process. The first UE may bear the required resource set report on the assigned resource and send the resource set report to the second UE.

3.1 Type B Configurations

Type B configurations may be used to indicate that the first UE may determine and report blacklist resource sets. The blacklist resource set includes resources which should not be used by the second UE, the Tx UE.

In some embodiments, Type B configurations may include at least one of the following: a configuration of reported resource pools, a configuration of blacklist resource criterion, a configuration of resource set report format, and/or a configuration of resources for the resource set report.

3.2 The Configuration of the Reported Resource Pool

The Type B configuration may include the configuration of the reported resource pool. The configuration of the reported resource pool may assign one or more SL resource pools from which blacklist resources may be selected. The configuration of each resource pool may include: resource pool period, slots included in one period, symbol allocation within a slot, RBs included in the resource pool, sub-channel size, PSCCH resource units, and/or PSSCH DMRS pattern (s). The resource pool assigned by the configuration of the reporting resource pools is a SL resource pool which may contain PSCCH, PSSCH and/or PSFCH resources. The reported resource pool may be a transmitting resource pool of the second UE, a receiving resource pool of the second UE, a receiving resource pool of the first UE, and the like. According to the configuration of the reported resource pool, the first UE may identify the blacklist resource(s) in the reported resource pool(s). Specifically, in response to the first UE receiving more than one reporting resource pools, the first UE may determine the blacklist resource for each resource pool independently.

In some embodiments, the first UE may receive more than one configured resource pool as a reported resource pool. In these situations, the assigned resource pools may be set as a reported resource pool list. In the reported resource pool list, each resource pool has a unique resource pool index. By indicating the resource pool index, the UEs may identify the corresponding resource pool in the reported resource pool list.

3.3 The Configuration of Blacklist Resource Criterion

The Type B configuration may include the configuration of one or more sets of blacklist resource criterion. One set of blacklist criterion may include at least one of the following: priority, RSRP threshold, time window, and/or Channel Busy Ratio (CBR) threshold. In some embodiments, resources may be blacklisted by combining the blacklist criterion.

The priority may indicate a data priority threshold. A resource carrying data with a priority that reaches the assigned priority threshold may be determined as a blacklist resource. In some embodiments, a threshold may be considered reached if the priority is equal to or higher than the threshold. In some embodiments, the threshold may be considered reached if the priority is higher than the threshold. In some embodiments, the threshold may be considered reached if the priority is equal to or lower than the threshold. In some embodiments, the threshold may be considered reached if the priority is lower than the threshold.

The RSRP threshold may set a power threshold of DMRS of PSSCH. A resource with RSRP that reaches the assigned RSRP threshold may be determined to be a blacklist resource.

The time window may indicate the slots in the time-domain corresponding to the blacklist resources.

The CBR threshold may set the CBR threshold of the resource pool. When the CBR of a resource pool reaches the assigned CBR threshold, blacklist resources of the resource pool may be reported.

According to the blacklist resource criterion configuration, the first UE may determine blacklist resource(s), the blacklist resource(s) indicating PSCCH, PSSCH and/or PSFCH resource(s) in the resource pool that are not available for sending and/or receiving SL data. The blacklist resources may be one of the following: the transmitting resources of the first UE, the receiving resources that the first UE uses in receiving other data, or the resources used by the first UE to communicate with a base station. The one or more blacklist resources corresponding to the blacklist resource criterion can be called a resource set.

In some embodiments, the blacklist resources can be determined by the first UE according to the first UE's information or resource usage without the configuration of the blacklist resource criterion. In some embodiments, in the case where the blacklist resources are configured, the first UE may determine the blacklist resources using the blacklist resource criterion and first UE's information of resource usage. The blacklist resources may include resources that are unavailable for the second UE's transmission on SL. According to the configuration of the blacklist criterion, the first UE may determine one or more blacklist resources within the assigned reported resource pool.

In some embodiments, more than one set of blacklist resource criterion may be configured in the Type B configuration. In these situations, the blacklist resource criterion set may be marked as a blacklist resource criterion set list. In a blacklist resource criterion set list, each blacklist resource criterion set has a unique index. By indicating the blacklist resource criterion set index, the UEs may identify the corresponding blacklist resource criterion set in the blacklist resource criterion set list. In some embodiments, the resource set index has a one-to-one relationship with the blacklist resource criterion set index. For example, the first UE may determine blacklist resources according to blacklist resource criterion set index #k, and composes the blacklist resources based on the blacklist resource criterion into the resource set index #k.

In some embodiments, the resource set index may be implicitly identified with the corresponding blacklist resource criterion set index. In other words, there is no resource set index. In these situations, the reported resource set may correspond with the blacklist resource criterion index.

3.4 Exemplary Embodiment #5

In one example, a first UE obtains information to form a resource set report by pre-configuration. The information indicates the Type B configuration and includes one blacklist resource criterion set. According to the configuration, the time window=1000 ms. Subsequently, the first UE determines the blacklist resources according to the configuration and its own information or resource data usage. Within the assigned time window, the first UE has several transmitting resources on a resource pool. Thus, the first UE determines the transmitting resources may be blacklisted resources of the resource pool and creates a blacklist resource set.

3.5 Exemplary Embodiment #6

A first UE receives information to form a resource set report from a base station. The information indicates the Type B configuration and includes one blacklist resource criterion set. According to the configuration, the time window=1000 ms, priority=3.

Subsequently, the first UE determines blacklist resources according to the configuration and its own information resource usage. According to the configuration, the first UE has two transmitting resources on a resource pool within the time window, where the priority of the first transmitting resource=2 and the priority of the second transmitting resource=3. In this example, the second transmitting resource reaches the assigned priority threshold and may be marked as a blacklist resource. Subsequently, a blacklist resource set may be created with the second transmitting resource in the blacklist resource set.

3.6 The Configuration of the Resource Set Report Format

The Type B configuration may include the configuration of the resource set report format. A resource set report format may include at least one of the following: the required resource set and/or the transmission type of resource set report. The first UE may obtain the configuration of resource set report formats through RRC signals, SCI, and/or MAC layer signaling (e.g., MAC CE) which may trigger the resource set report process. In some embodiments, the first UE may receive the resource set report format indication in the $1^{st}$ stage SCI. For example, using the reserved bit(s) in the first stage SCI to indicate the resource set report format index. In some embodiments, the first UE may receive the resource set report format indication in the $2^{nd}$ stage SCI. For example, defining a new $2^{nd}$ stage SCI format to indicate one or more resource set report format indices, or to indicate the required resource set and the type of resource set report.

In some embodiments, more than one resource set report formats may be configured. In these situations, the set report formats may be marked as a resource set report format list. In a resource set report format list, each resource set report format has a unique index. By indicating the resource set report format index, the UEs may identify the corresponding resource set format report in the resource set report format list. In some embodiments, multiple resource sets are indicated in a resource set report format and the type of the resource set report may be configured for each resource set respectively.

Where the resource set report format indicates a required resource set, the first UE may report the specified resource set. To indicate the required resource set, the resource set index may be used to identify the target resource set(s), or, a bitmap sequence may be used to indicate the target resource sets in a resource set list one-by-one. In some embodiments, the required resource set may use one bit to indicate whether or not that required resource set needs to be reported to the second UE, the Tx UE.

Where the resource set report format includes the transmission type of the resource set report, the first UE may send a resource set report periodically or by one-shot. In the situation where the resource set report is configured to be reported periodically, the first UE may send the assigned resource set report with the specified period. Between periods, the first UE may update the resource set report based on the first UE's own information of resource usage. In the situation where the resource set report is configured as one-shot reporting, the first UE may send the assigned resource set report for one time.

In some embodiments, multiple resource sets are indicated in a resource set report format, the type of resource set report may be configured for each resource set respectively.

3.7 The Configuration of Resources for the Resource Set Report

The Type B configuration may include the configuration of resources for the resource set report. The resources used for carrying the resource set report may be configured/pre-configured, configured by the base station, selected by the first UE itself, or indicated by a second UE. The first UE may send the blacklist resource set report on SL. In the situation where the resource to bear the resource set report is configured/pre-configured, the configuration of resources for the resource set report may indicate one or more SL resources for carrying the resource set report. In the situation where the first UE selects SL resource itself to transmit the resource set report, the resource selection scheme may be randomly selected within the transmitting resource pool, or sensing based resource selection. The indicated resources for the resource set report may be PSCCH and/or PSSCH resources.

In one embodiment, the configured resources for the resource set report may be one-shot resources which contain one or more resources for reporting resource set reports one time. In other embodiments, the configured resources for the resource set report may be periodical resource which contain resource with certain periods for periodical resource set reports.

The first UE may receive the configuration of the resources for the resource report through RRC signaling and/or SCI. By using RRC signaling, the configured grant may be used to assign the resource for the resource set report, including configured grant type 1 and/or type 2. By using SCI, the first UE may use the resources for the resource set report which is assigned in the $1^{st}$ stage SCI and/or $2^{nd}$ stage SCI. In some embodiments, by using SCI, the first UE may use a PSSCH retransmission resource of the second UE's data packet as the resource for the resource set report.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

The invention claimed is:

1. A wireless communication method, comprising:
receiving, by a first wireless communication device comprising a first user equipment (UE) from a second wireless communication device comprising a second UE, a request to trigger a resource set report process, the request including a configuration indicating one or more sets of sensing parameters;
determining, by the first wireless communication device, a set of resources to indicate in the resource set report according to the request; and
transmitting, by the first wireless communication device to the second wireless communication device, the resource set report indicating the set of resources for the second wireless communication device to select one or more resources for sidelink transmissions, according to the resource set report.

2. The wireless communication method of claim 1, wherein the request includes a second configuration indicating one or more resource pools from which the set of resources are selected.

3. The wireless communication method of claim 2, wherein the one or more resource pools are indicated by respective indices of a list included in the second configuration.

4. The wireless communication method of claim 1, wherein each of the one or more sets of sensing parameters includes at least one of:
a time-domain period of one or more resources that are required to be included in the set of resources;
a frequency-domain size of the one or more resources that are required to be included in the set of resources;
a data priority; or
a time window.

5. The wireless communication method of claim 1, wherein the required information includes a second configuration indicating one or more formats of the resource set report.

6. The wireless communication method of claim 5, wherein each of the one or more formats of the resource set report includes an indication of one or more resource sets that are required to be included in the resource set report, wherein the set of resources comprises the one or more sets of resources according to the indication.

7. A first wireless communication device comprising a first user equipment (UE), the first wireless communication device comprising:
one or more processors configured to:
receive, via a receiver from a second wireless communication device comprising a second UE, a request to trigger a resource set report process, the request including a configuration indicating one or more sets of sensing parameters;
determine a set of resources to indicate in the resource set report according to the request; and
transmit, via a transmitter to the second wireless communication device, the resource set report indicating the set of resources for the second wireless communication device to select one or more resources for sidelink transmissions, according to the resource set report.

8. The first wireless communication device of claim 7, wherein the request includes a second configuration indicating one or more resource pools from which the set of resources are selected.

9. The first wireless communication device of claim 8, wherein the one or more resource pools are indicated by respective indices of a list included in the second configuration.

10. The first wireless communication device of claim 7, wherein each of the one or more sets of sensing parameters includes at least one of:
a time-domain period of one or more resources that are required to be included in the set of resources;
a frequency-domain size of the one or more resources that are required to be included in the set of resources;
a data priority; or
a time window.

11. The first wireless communication device of claim 7, wherein the required information includes a second configuration indicating one or more formats of the resource set report.

12. The wireless communication method of claim 11, wherein each of the one or more formats of the resource set report includes an indication of one or more resource sets that are required to be included in the resource set report, wherein the set of resources comprises the one or more sets of resources according to the indication.

* * * * *